(12) United States Patent
Shin et al.

(10) Patent No.: US 7,130,729 B2
(45) Date of Patent: Oct. 31, 2006

(54) ADAPTIVE COMPENSATION OF REAR-WHEEL STEERING CONTROL USING VEHICLE DYNAMICS PARAMETER ESTIMATION

(75) Inventors: Kwang-Keun Shin, Rochester Hills, MI (US); Shih-Ken Chen, Troy, MI (US)

(73) Assignee: General Motors Corporation, Detroit, MI (US)

( * ) Notice: Subject to any disclaimer, the term of this patent is extended or adjusted under 35 U.S.C. 154(b) by 289 days.

(21) Appl. No.: 10/899,446

(22) Filed: Jul. 26, 2004

(65) Prior Publication Data

US 2006/0020382 A1    Jan. 26, 2006

(51) Int. Cl.
 *B62D 6/00* (2006.01)
 *B62D 1/02* (2006.01)

(52) U.S. Cl. .................. 701/42; 701/41; 280/5.51; 180/6.2; 180/6.62

(58) Field of Classification Search ............ 701/41–43; 280/5.51; 180/6.2, 6.62
See application file for complete search history.

(56) References Cited

U.S. PATENT DOCUMENTS

| | | | |
|---|---|---|---|
| 6,643,573 B1 * | 11/2003 | Dickinson et al. ............ 701/41 |
| 6,789,002 B1 * | 9/2004 | Hac et al. ...................... 701/1 |
| 6,819,998 B1 * | 11/2004 | Lin et al. ...................... 701/70 |
| 6,862,506 B1 * | 3/2005 | Boswell et al. ............... 701/41 |
| 6,892,123 B1 * | 5/2005 | Hac ............................. 701/48 |
| 2005/0278077 A1 * | 12/2005 | Shin et al. ..................... 701/1 |

* cited by examiner

*Primary Examiner*—Y. Beaulieu
(74) *Attorney, Agent, or Firm*—Kathryn A. Marra (57) ABSTRACT

An active rear-wheel vehicle steering control system that employs both open-loop and closed-loop control, where the open-loop and closed-loop control include adaptive compensation sub-systems that compensate for changes in vehicle dynamic parameters. The control system includes a dynamic parameter estimation sub-system that provides an estimated front-wheel cornering compliance and rear-wheel cornering compliance based on a front-wheel steering angle signal, a rear-wheel steering angle signal, a vehicle lateral acceleration signal, a vehicle yaw rate signal and a vehicle speed signal. The closed-loop control includes active gain for each of vehicle yaw rate, vehicle yaw rate acceleration, side-slip velocity and side-slip velocity rate, all based on the vehicle speed and vehicle dynamic parameter changes.

23 Claims, 4 Drawing Sheets

FIG - 7b

ADAPTIVE COMPENSATION OF REAR-WHEEL STEERING CONTROL USING VEHICLE DYNAMICS PARAMETER ESTIMATION

BACKGROUND OF THE INVENTION

1. Field of the Invention

This invention relates generally to open-loop control and closed-loop control for active vehicle rear-wheel steering and, more particularly, to open-loop control and closed-loop control for active rear-wheel steering, where both the open-loop control and the closed-loop control employ vehicle parameter estimates to compensate for changes in vehicle parameters.

2. Discussion of the Related Art

It is known in the art to employ automatic rear-wheel vehicle steering based on vehicle dynamic information during a vehicle turn, or yaw, to enhance the vehicle stability. Active wheel steering control of a vehicle can improve vehicle stability over a conventional vehicle having only steerable front wheels. The rear-wheel steering assist can be in-phase steering or out-of-phase steering. In-phase rear wheel steering steers the rear wheels in the same direction as the front wheels, and is typically provided at higher vehicle speeds. Out-of-phase rear wheel steering steers the rear wheels in an opposite direction as the front wheels to provide a tighter turning radius, and is typically provided at lower vehicle speeds.

Open-loop automatic rear-wheel steering provides a certain amount of rear-wheel steering assist depending on the amount of front-wheel steering provided by the vehicle operator. In other words, a predetermined function is used to turn the rear wheels a certain amount, either in-phase or out-of-phase, in response to the turning of the front wheels at a particular vehicle speed. It is known to provide closed-loop automatic rear-wheel steering based on feedback in the event that the vehicle is not following the steering path commanded by the vehicle operator. For example, slippery road conditions may prevent the vehicle from turning in the desired direction because the wheels may slip along the road surface. Further, the vehicle's rear quarter may "fish-tail," also providing a different turn angle than was intended. Closed-loop rear-wheel steering assist systems sense the actual vehicle yaw rate and the commanded yaw rate, and generate a gain signal that provides the steering assist by the rear wheels if the vehicle yaw rate and the commanded yaw rate are not the same. In these types of active rear-wheel steering control systems, the open-loop control is always active and the closed-loop control is only activated if a potential handling and stability problem is detected.

Vehicles are designed so that the vehicle handling response complies with certain design specifications. Vehicle dynamic parameters define the vehicle handling response, where nominal parameters define a nominal vehicle handling response. The vehicle dynamic parameters of understeer coefficient, front cornering compliance and rear cornering compliance are the most dominant dynamic vehicle parameters for determining the stability and dynamic handling behavior of a vehicle. The understeer coefficient defines the vehicle yaw rate or turning radius for a particular steering angle. The front cornering compliance and the rear cornering compliance define the distribution of the vehicle side-slip to the front and rear axles when the vehicle is turning. The cornering compliances include the ratio defined by the lateral slip angle and the lateral force of the wheels. These parameters vary according to different vehicle loading, tire pressure, tire wear, and vehicle-to-vehicle variations of suspension characteristics, etc.

The control gains for rear-wheel steering control systems, including both open-loop and closed-loop control, are optimally determined based on "out-of-factory" vehicle dynamic parameters. During operation of the vehicle over its lifetime, however, the factory-tuned vehicle parameters change as a result of short-term vehicle variations, such as vehicle loading and tire pressure changes, and long-term variations, such as tire wear and vehicle suspension age. When the vehicle dynamic parameters change from their original settings, the original steering control gains are no longer optimal, resulting in a different vehicle handling feel and vehicle stability degradation.

U.S. patent application Ser. No. 10/863,956, titled Real-Time Vehicle Dynamics Estimation System, filed Jun. 9, 2004, assigned to the assignee of this application and herein incorporated by reference, discloses a system that determines vehicle parameter estimates as a vehicle ages to provide an indication of a potential problem. It would be desirable to use these estimated dynamic parameters in an open-loop and closed-loop rear-wheel active steering system to improve the closed-loop steering control gains and the open-loop steering gain as the vehicle ages and is subjected to different conditions. By modifying the open-loop and closed-loop gain schedule in response to estimated vehicle dynamic parameters, the handling feel and directional stability of the original vehicle can be maintained over the lifetime of the vehicle.

SUMMARY OF THE INVENTION

In accordance with the teachings of the present invention, an active rear-wheel vehicle steering control system is disclosed that employs both open-loop control and closed-loop control, where the open-loop and closed-loop control include adaptive compensation sub-systems that compensate for changes in vehicle dynamic parameters. The control system includes a dynamic parameter estimation sub-system that provides an estimated front-wheel cornering compliance and rear-wheel cornering compliance based on a front-wheel steering angle signal, a rear-wheel steering angle signal, a vehicle lateral acceleration signal, a vehicle yaw rate signal and a vehicle speed signal. The closed-loop control includes active gain for each of vehicle yaw rate, vehicle yaw rate acceleration, side-slip velocity and side-slip velocity rate based on the vehicle speed and vehicle dynamic parameter changes. A switch switches off the adaptive open-loop compensation if the closed-loop control is activated.

Additional advantages and features of the present invention will become apparent from the following description and appended claims, taken in conjunction with the accompanying drawings.

BRIEF DESCRIPTION OF THE DRAWINGS

FIGS. 4(a)–7(a) are graphs with vehicle speed on the horizontal axis and gain on the vertical axis showing typical closed-loop gain sensitivity for yaw rate feedback, yaw rate acceleration feedback, side-slip feedback and side-slip rate feedback, respectively, for changes in the front-wheel cornering compliance; and FIGS. 4(b)–7(b) are graphs with vehicle speed on the horizontal axis and gain on the vertical axis showing typical closed-loop gain sensitivity for yaw rate feedback, yaw rate acceleration feedback, side-slip feedback and side-slip rate feedback, respectively, for changes in the rear-wheel cornering compliance.

DETAILED DESCRIPTION OF THE EMBODIMENTS

The following discussion of the embodiments of the invention directed to an active rear-wheel steering system employing compensation for changes in vehicle dynamics parameters is merely exemplary in nature, and is in no way intended to limit the invention or its applications or uses.

Figure 1:
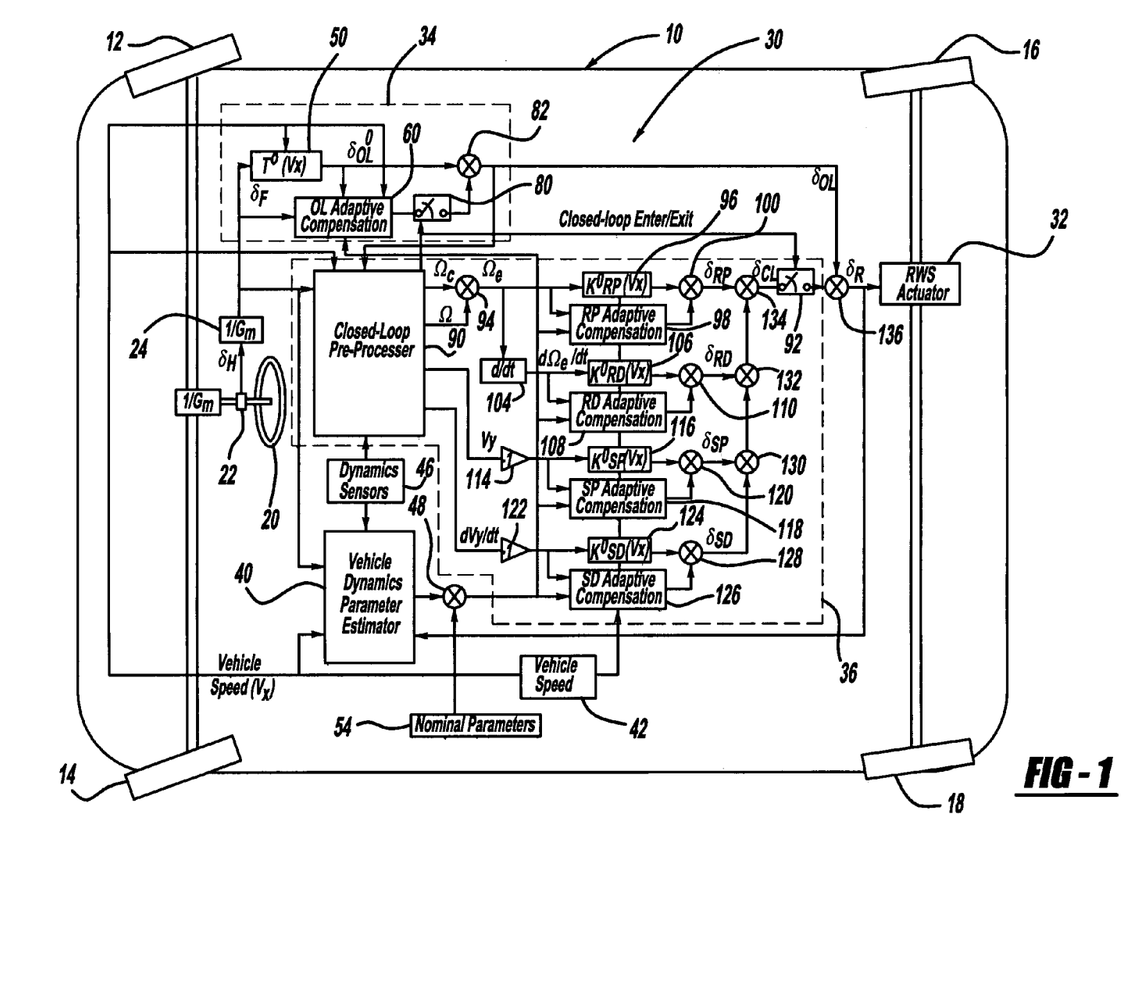
FIG. 1 is a schematic block diagram of a rear-wheel steering control system employing estimated vehicle dynamic parameters, according to an embodiment of the present invention.

FIG. 1 is a plan view of a vehicle 10 including front wheels 12 and 14 and rear wheels 16 and 18. The front wheels 12 and 14 are steered by a vehicle steering wheel 20. A steering angle sensor 22 measures the steering angle of the steering wheel 20 and provides a steering wheel angle signal $\delta_H$ to a gain device 24. The gain device 24 divides the steering wheel angle signal $\delta_H$ with gear ratio $G_m$ to produce a scaled front wheel steering angle signal $\delta_F$. The vehicle 10 includes an active rear-wheel steering control system 30 that generates a rear-wheel steering control signal $\delta_R$ that is applied to a rear-wheel steering actuator 32 to steer the rear wheels 16 and 18, as will be discussed in detail below.

The control system 30 includes an open-loop control sub-system 34 that provides an open-loop steering control signal $\delta_{OL}$ and a closed-loop control sub-system 36 that provides a closed-loop steering control signal $\delta_{CL}$. The control system 30 also includes a real-time vehicle dynamics estimation sub-system 40 that estimates the front-wheel cornering compliance $D_F$ and the rear-wheel cornering compliance $D_R$. In one embodiment, the dynamics estimation sub-system 40 is the real-time vehicle dynamics estimation system disclosed in the '666 application, however, other real-time vehicle dynamics estimation systems may also be applicable. The control system 30 also includes a vehicle speed sensor 42 that provides a vehicle speed signal Vx to all of the open-loop control sub-system 34, the closed-loop control sub-system 36 and the parameter estimation sub-system 40. The open-loop control sub-system 34, the closed-loop control sub-system 36 and the parameter estimation sub-system 40 also receive the front-wheel steering angle signal $\delta_F$, and the closed-loop control sub-system 36 and the parameter estimation sub-system 40 both receive a vehicle yaw rate signal Ω and a vehicle lateral acceleration (side-slip) signal Ay from suitable yaw rate and lateral acceleration dynamic sensors 46. The parameter estimation sub-system 40 also receives the rear-wheel steering angle signal $\delta_R$.

Figure 2:
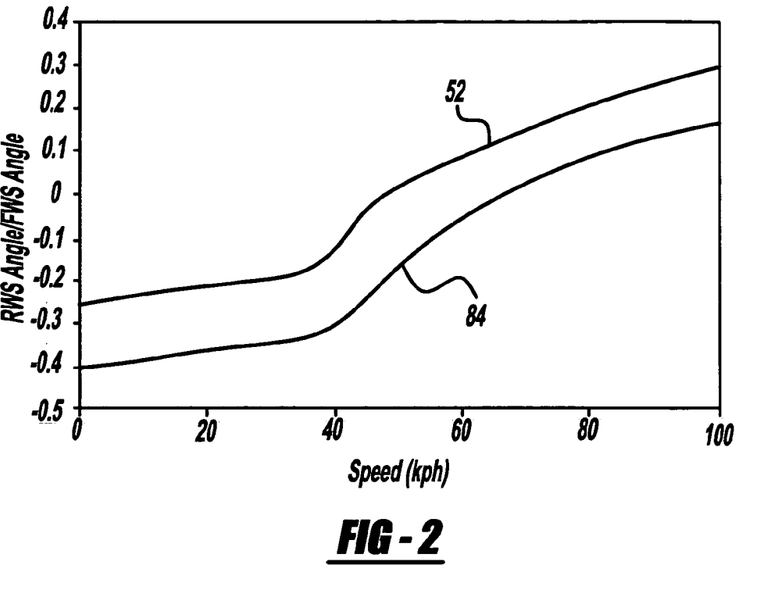
FIG. 2 is a graph with vehicle speed on the horizontal axis and rear-wheel steering angle/front wheel steering angle on the vertical axis showing a typical open-loop gain table.

The open-loop control sub-system 34 includes an open-loop look-up table process block 50 that provides a nominal open-loop rear-wheel steering angle signal $\delta^0{}_{OL}$ from a look-up table. FIG. 2 is a graph with vehicle speed on the horizontal axis and rear-wheel steering (RWS) angle/front-wheel steering (FWS) angle on the vertical axis that gives a typical rear-wheel steering open-loop gain schedule for a particular vehicle. Graph line 52 provides the nominal open loop rear-wheel steering wheel angle for the original or nominal vehicle dynamics parameters. The open-loop rear-wheel steering angle $\delta^0{}_{OL}$ signal as provided by the process block 50 is well known in the art.

The estimated vehicle parameters of the front-wheel cornering compliance $D_F$ and the rear-wheel cornering compliance $D_R$ from the dynamics estimation sub-system 40 are applied to an adder 48 where they are added to a nominal front-wheel cornering compliance $D_F{}^0$ and a nominal rear-wheel cornering compliance $D_R{}^0$ that are the original "factory-tuned" front-wheel and rear-wheel cornering compliances. The output of the adder 48 is the change in the front-wheel cornering compliance $\Delta D_F$ and the change in the rear-wheel cornering compliance $\Delta D_R$, which are applied to the open-loop control sub-system 34. If the estimated vehicle dynamics parameters are still the nominal parameters, then the changes in the vehicle dynamics parameters is zero.

Figure 3:
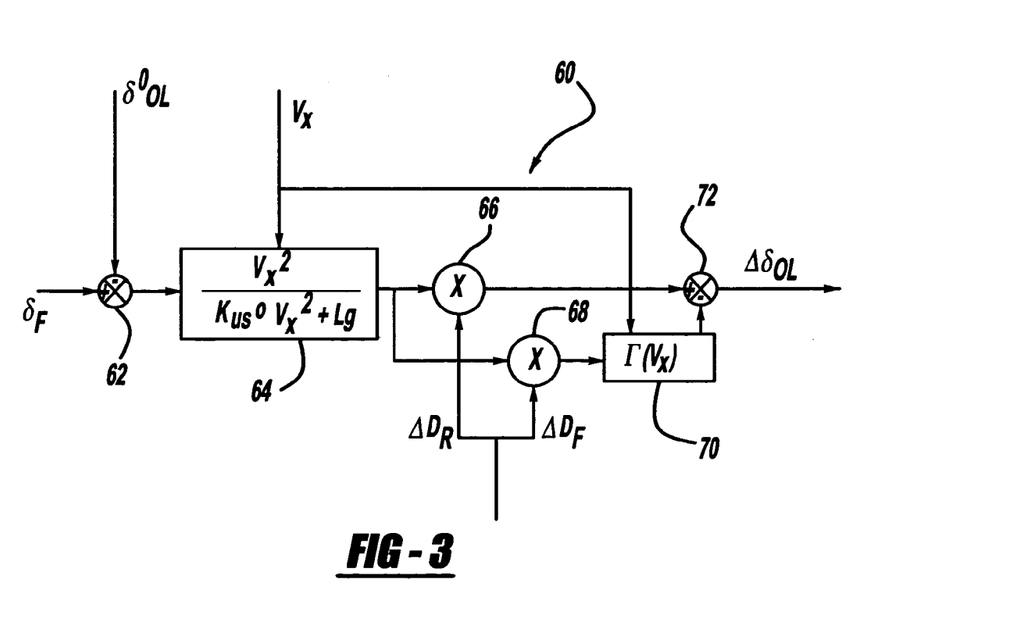
FIG. 3 is a schematic block diagram of an open-loop adaptive compensation sub-system for the control system shown in FIG. 1.

According to the invention, the open-loop control sub-system 34 includes an open-loop adaptive compensation process block 60 shown in detail in FIG. 3. The process block 60 modifies the nominal open-loop rear-wheel steering angle signal $\delta_{OL}{}^0$ to compensate for the vehicle parameter changes, namely the front-wheel cornering compliance $D_F$ and the rear-wheel cornering compliance $D_R$. The process block 60 includes an adder 62 that provides a difference between the nominal open-loop rear-wheel steering angle signal $\delta_{OL}{}^0$ and the front-wheel steering angle signal $\delta_F$. A process compensation block 64 receives the difference between the nominal open-loop rear-wheel steering angle signal $\delta_{OL}{}^0$ and the front-wheel steering angle signal $\delta_F$ and receives the vehicle speed signal Vx. The process block 64 generates a compensation signal calculated from a predetermined formula that is applied to a first multiplier 66 and a second multiplier 68. The change in the rear-wheel cornering compliance $\Delta D_R$ is also applied to the multiplier 66 and the change in the front-wheel cornering compliance $\Delta D_F$ is also applied to the multiplier 68. The multiplied signal from the multiplier 68 is applied to a front adaptation gain process block 70 along with the vehicle speed signal Vx to provide front-wheel adaptation gain. The multiplied signal from the multiplier 66 and the gain signal from the adaptation process block 70 are applied to an adder 72 to generate an open-loop rear-wheel steering angle compensation signal $\Delta\delta_{OL}$.

The process block 60 generates the open-loop rear-wheel steering angle compensation signal $\Delta\delta_{OL}$ from calculations based on a bicycle model representative of the motion of the vehicle, which model is well understood by those skilled in the art. In one embodiment, the process block 60 generates the steering angle compensation signal $\Delta\delta_{OL}$ from the bicycle model as:

$$\Delta\delta_{OL} = \left[(\hat{D}_R - D_R^0) - (\hat{D}_F - D_F^0)\Gamma(V_x)\right] \frac{V_x^2}{(K_{us}^0 V_x^2 + Lg)} (\delta_F - \delta_{OL}^0) \quad (1)$$

where, $\Delta\delta_R$ is the compensation angle;

$\hat{D}_F$ is the front-wheel cornering compliance estimation;

$\hat{D}_R$ is the rear-wheel cornering compliance estimation;

$D_F{}^0$ is the original vehicle front-wheel cornering compliance;

$D_R{}^0$ is the original vehicle rear-wheel cornering compliance;

$\Gamma(V_x)$ is the front adaptation gain;

$K_{us}^0$ is the original vehicle understeer coefficient;

L is the vehicle wheel base; and g is the constant of gravity.

The front adaptation gain signal $\Gamma(V_x)$ can be selected according to any suitable compensation strategy. According to the invention, there are three possible compensation strategies, including a yaw rate gain recovery strategy:

$$\Gamma(V_x)=1, \qquad (2)$$

a side-slip gain recovery strategy:

$$\Gamma(V_x) = \left(\frac{\hat{D}_R V_x^2 - bg}{\hat{D}_F V_x^2 + ag}\right), \text{ and} \qquad (3)$$

a side-slip to yaw rate ratio recovery strategy:

$$\Gamma(V_x)=T^0(V_x), \qquad (4)$$

where, a is the distance from the front axle of the vehicle to the center of gravity;

b is the distance from the rear axle of the vehicle to the center of gravity; and $T^0(V_x)$ is the original front-to-rear gear ratio schedule.

The open-loop rear-wheel steering angle compensation signal $\Delta\delta_{OL}$ from the adaptive compensation system 60 is sent to a switch 80 that when opened turns off the open-loop wheel steering angle compensation signal $\Delta\delta_{OL}$ for those times when the rear-wheel steering assist is being provided by the closed-loop sub-system 36. When the switch 80 is closed, the compensation signal $\Delta\delta_{OL}$ is applied to an adder 82 where it is added to the nominal open-loop steering angle signal $\delta^0_{OL}$. The added signals provide the open-loop steering signal $\delta_{OL}$ at the output of the open-loop sub-system 34. An example of an open-loop steering signal that has been adapted based on the changes in the vehicle dynamics parameters in this manner is shown as graph line 84 in FIG. 2.

The closed-loop sub-system 36 includes a pre-processing block 90 that receives the various sensor signals discussed above. The pre-processing block 90 operates as a command interpreter and sensor signal pre-processing and conversion, and provides closed-loop enter and exit criteria. The pre-processing block 90 provides output signals including the actual vehicle yaw rate signal $\Omega$, a yaw rate command signal $\Omega_c$, a vehicle side-slip feedback signal Vy and the derivative of the side-slip feedback signal dVy/dt. The yaw rate signal $\Omega$ and the yaw rate command signal $\Omega_c$ are applied to an adder 94 to obtain a yaw rate error signal $\Omega_e$ that is the difference between the commanded vehicle yaw rate and the actual vehicle yaw rate. A closed-loop pre-processing block that performs these functions is known in the art, and a detailed discussion of its operation is not necessary for a proper understanding of the invention.

The entrance and exit criteria for the closed-loop rear-wheel steering assist is based on the vehicle side-slip (lateral acceleration) and yaw rate error. If the vehicle side-slip and yaw rate error are great enough, then the pre-processing block 90 will close a switch 92 so that the closed-loop rear-wheel steering command signal $\delta_{CL}$ is used to help provide the rear-wheel steering to properly steer the vehicle. Additionally, the entrance/exit signal is applied to the switch 80 so that if the closed-loop signal $\delta_{CL}$ is being used to help provide the rear-wheel steering, then the open-loop compensation signal $\Delta\delta_{OL}$ is not included as part of the open-loop steering signal $\delta_{OL}$.

The closed-loop steering signal $\delta_{CL}$ is a summation of several feedback signals including yaw rate feedback (RP), yaw rate acceleration feedback (RD), side-slip feedback (SP) and side-slip rate feedback (SD). The yaw rate error signal $\Omega_e$ is applied to a yaw rate feedback look-up table 96 and a yaw rate feedback adaptive compensation process block 98. The look-up table 96 provides a predetermined yaw rate feedback angle signal based on the nominal front-wheel cornering compliance and the rear-wheel cornering compliance and the vehicle speed of the vehicle 10 in response to the yaw rate error signal $\Omega_e$. Yaw rate feedback look-up tables for a closed-loop rear-wheel steering assist system are known in the art. The yaw rate feedback adaptive compensation process block 98 receives the vehicle speed signal Vx and the change in the front-wheel and rear-wheel cornering compliances $\Delta D_F$ and $\Delta D_R$, and provides a corrected yaw rate feedback angle signal as the front-wheel and rear-wheel cornering compliances change as the vehicle ages. The original yaw rate feedback angle signal and the corrected yaw rate feedback angle signal are sent to an adder 100 where they are combined to provide an adapted yaw rate feedback angle signal $\delta_{RP}$. Equation (5) shows how the adapted yaw rate feedback angle signal $\delta_{RP}$ is calculated in one non-limiting embodiment.

$$\delta_{RP} = K_{RP}^0(V_x) \cdot (\Omega_c - \Omega) + \qquad (5)$$
$$\left(\frac{\Delta K_{RP}}{\Delta T}|_0 \Delta T(V_x) + \frac{\Delta K_{RP}}{\Delta D_F}|_0 \Delta D_F + \frac{\Delta K_{RP}}{\Delta D_R}|_0 \Delta D_R\right) \cdot (\Omega_c - \Omega)$$

where, $\Omega$ is the yaw rate;

$\Omega_c$ is the yaw rate command;

$V_y$ is the vehicle side-slip velocity at the center of gravity;

$\dot{V}_y$ is the vehicle side-slip velocity rate at the center of gravity and is equivalent to $(A_y - \Omega V_x)$;

$K^0_{RP}(V_x)$ is the nominal yaw rate feedback gain table as a function of vehicle speed;

$K^0_{RD}(V_x)$ is the nominal yaw acceleration feedback gain table as a function of the vehicle speed;

$K^0_{SP}(V_x)$ is the nominal side-slip velocity feedback gain table as a function of the vehicle speed;

$K^0_{SD}(V_x)$ is the nominal side-slip velocity rate feedback gain table as a function of the vehicle speed;

$\Delta D_F$ is the change in the front-wheel cornering compliance;

$\Delta D_R$ is the change in the rear-wheel cornering compliance;

$\Delta T$ is the deviation in the open-loop gain;

$$\frac{\Delta K_{RP}}{\Delta T}|_0, \frac{\Delta K_{RP}}{\Delta D_F}|_0; \frac{\Delta K_{RP}}{\Delta D_R}|_0$$

is the yaw-rate P-gain sensitivity to open-loop gain, front-wheel cornering compliance, and rear-wheel cornering compliance, respectively;

$$\frac{\Delta K_{RP}}{\Delta T}|_0, \frac{\Delta K_{RP}}{\Delta D_F}|_0; \frac{\Delta K_{RP}}{\Delta D_R}|_0$$

is the yaw-rate D-gain sensitivity to open-loop gain, front-wheel cornering compliance, and rear-cornering compliance, respectively;

$$\frac{\Delta K_{RP}}{\Delta T}|_0, \frac{\Delta K_{RP}}{\Delta D_F}|_0; \frac{\Delta K_{RP}}{\Delta D_R}|_0$$

is the side-slip-velocity gain sensitivity to open-loop gain, front-wheel cornering compliance, and rear-wheel cornering compliance, respectively; and $$\frac{\Delta K_{RP}}{\Delta T}|_0, \frac{\Delta K_{RP}}{\Delta D_F}|_0; \frac{\Delta K_{RP}}{\Delta D_R}|_0$$

is the side-slip-velocity-rate gain sensitivity to open-loop gain, front-wheel cornering compliance, and rear-wheel cornering compliance, respectively.

Figure 4A:
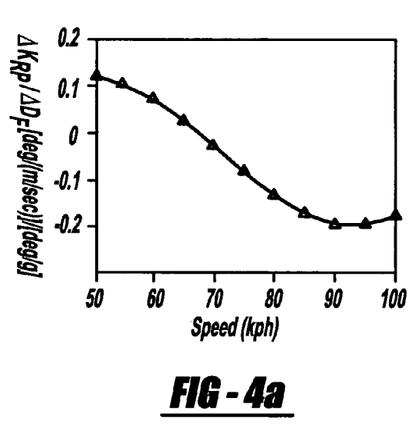
Figure 4B:
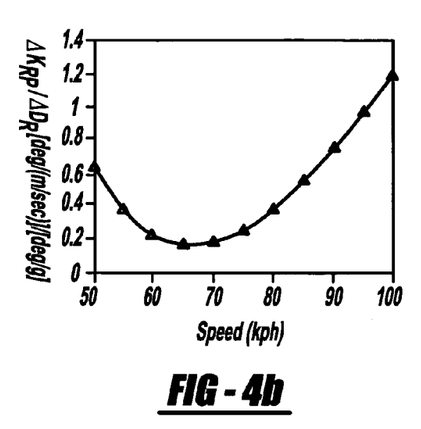

FIGS. 4(a) and 4(b) are graphs with vehicle speed on the horizontal axis and yaw rate feedback angle on the vertical axis showing examples of gain sensitivities corresponding to changes in the front-wheel cornering compliance and the rear-wheel cornering compliance, respectively.

The yaw rate error signal $\Omega_e$ is applied to a derivative process block 104 that generates a derivative of the error signal $d\Omega_e/dt$. The derivative error signal $d\Omega_e/dt$ is applied to a yaw rate acceleration feedback look-up table 106 and a yaw rate acceleration feedback adaptive compensation process block 108. The look-up table 106 provides a predetermined yaw rate acceleration feedback angle signal based on the nominal front-wheel cornering compliance and the rear-wheel cornering compliance and the vehicle speed of the vehicle 10. Yaw rate acceleration feedback look-up tables for a closed loop rear-wheel steering assist system are known in the art. The yaw rate acceleration feedback adaptive compensation process block 108 receives the vehicle speed signal Vx and the change in the front-wheel and rear-wheel cornering compliances $\Delta D_F$ and $\Delta D_R$, and provides a corrected yaw rate acceleration feedback angle signal as the front-wheel and rear-wheel cornering compliances change as the vehicle ages. The original yaw rate acceleration feedback angle signal and the corrected yaw rate acceleration feedback angle signal are applied to an adder 110 to provide an adapted yaw rate acceleration feedback angle signal $\delta_{RD}$. Equation (6) shows how the adapted yaw rate feedback angle signal $\delta_{RD}$ is calculated in one non-limiting embodiment.

$$\delta_{RD} = K_{RD}^0(V_x) \cdot (\dot{\Omega}_c - \dot{\Omega}) + \left( \frac{\Delta K_{RD}}{\Delta T}|_0 \Delta T(V_x) + \frac{\Delta K_{RD}}{\Delta D_F}|_0 \Delta D_F + \frac{\Delta K_{RD}}{\Delta D_R}|_0 \Delta D_R \right) \cdot (\dot{\Omega}_c - \dot{\Omega}) \quad (6)$$

Figure 5A:
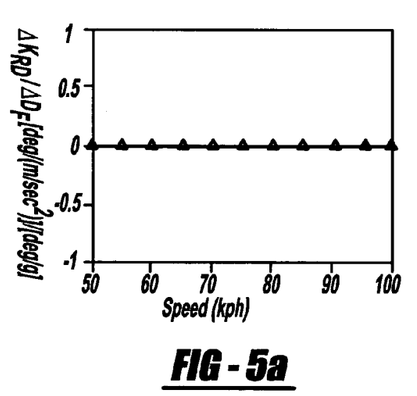
Figure 5B:
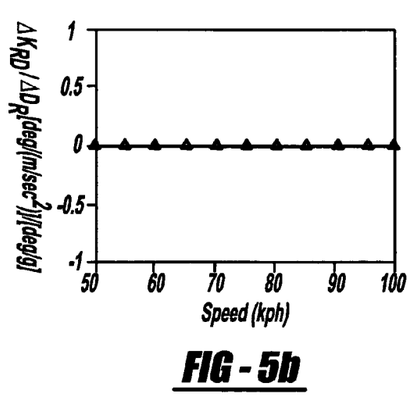

FIGS. 5(a) and 5(b) are graphs with vehicle speed on the horizontal axis and yaw rate acceleration feedback angle on the vertical axis showing examples of gain sensitivities corresponding to changes in the front-wheel cornering compliance and the rear-wheel cornering compliance, respectively.

The lateral vehicle acceleration signal Vy from the pre-processing block 90 is applied to an inverter 114 and the inverted lateral acceleration signal is applied to a side-slip feedback look-up table 116 and a side-slip feedback adaptive compensation process block 118. The look-up table 116 provides a predetermined side-slip feedback angle signal for the original front-wheel and rear-wheel cornering compliances and the vehicle speed of the vehicle 10. Side-slip feedback look-up tables for a closed loop rear-wheel steering assist system are known in the art. The side-slip feedback adaptive compensation process block 118 receives the vehicle speed signal Vx and the change in the front-wheel and rear-wheel cornering compliance signals, and provides a corrected side-slip feedback angle signal as the front-wheel and the rear-wheel corning compliances change as the vehicle ages. The original side-slip feedback angle signal and the corrected side-slip feedback angle signal are applied to an adder 120 to generate an adapted side-slip feedback angle signal $\delta_{SP}$. Equation (7) shows how the adapted side-slip feedback angle signal $\delta_{SP}$ is calculated in one non-limiting embodiment.

$$\delta_{SP} = K_{SP}^0(V_x) \cdot V_y + \left( \frac{\Delta K_{SP}}{\Delta T}|_0 \Delta T(V_x) + \frac{\Delta K_{SP}}{\Delta D_F}|_0 + \Delta D_F + \frac{\Delta K_{SP}}{\Delta D_R}|_0 \Delta D_R \right) \cdot V_y \quad (7)$$

Figure 6A:
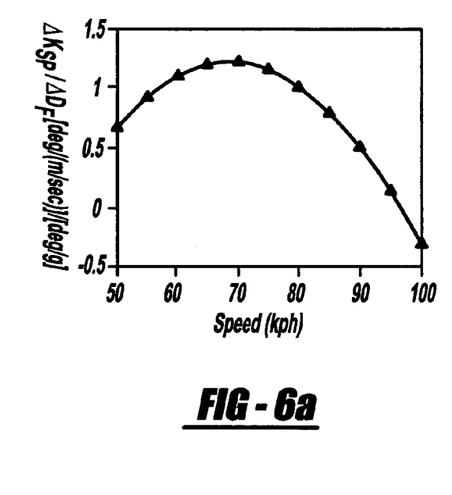
Figure 6B:
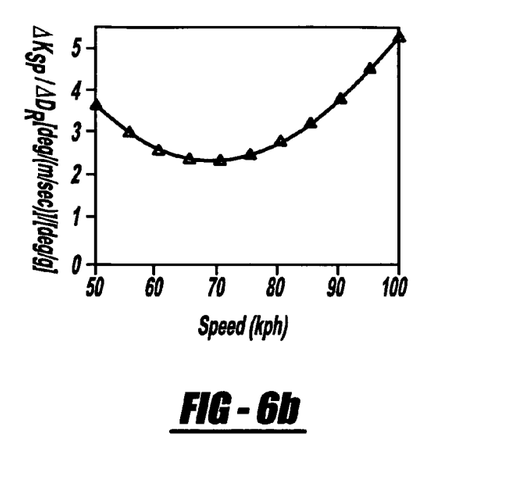

FIGS. 6(a) and 6(b) are graphs with vehicle speed on the horizontal axis and side-slip feedback angle on the vertical axis showing examples of gain sensitivities corresponding to changes in the front-wheel cornering compliance and the rear-wheel cornering compliance, respectively.

The derivative of the vehicle lateral acceleration signal dVy/dt is applied to an inverter 122, and the inverted lateral acceleration derivative signal is applied to a side-slip rate feedback look-up table 124 and a side-slip rate feedback adaptive compensation process block 126. The look-up table 124 provides a predetermined side-slip rate feedback angle signal based on the nominal front-wheel cornering compliance and the rear-wheel cornering compliance and the vehicle speed of the vehicle 10. Side-slip rate feedback look-up tables for a closed loop rear-wheel steering assist system are known in the art. The adaptive compensation process block 126 receives the vehicle speed signal Vx and the change in the front-wheel and rear-wheel cornering compliance signals, and provides a corrected side-slip rate feedback angle signal. The original side-slip rate feedback angle signal and the corrected side-slip rate feedback angle signal are applied to an adder 128 that generates an adapted side-slip rate feedback angle signal $\delta_{SD}$. Equation (8) shows how the side-slip rate feedback angle signal $\delta_{SD}$ is calculated in one non-limiting embodiment.

$$\delta_{SD} = K_{SD}^0(V_x) \cdot \dot{V}_y + \left( \frac{\Delta K_{SD}}{\Delta T}|_0 \Delta T(V_x) + \frac{\Delta K_{SD}}{\Delta D_F}|_0 \Delta D_F + \frac{\Delta K_{SD}}{\Delta D_R}|_0 \Delta D_R \right) \cdot \dot{V}_y \quad (8)$$

Figure 7A:
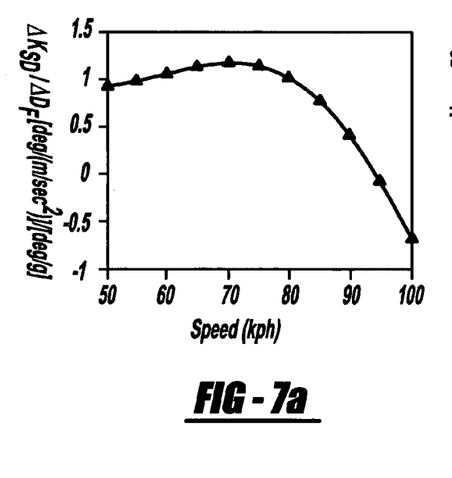
Figure 7B:
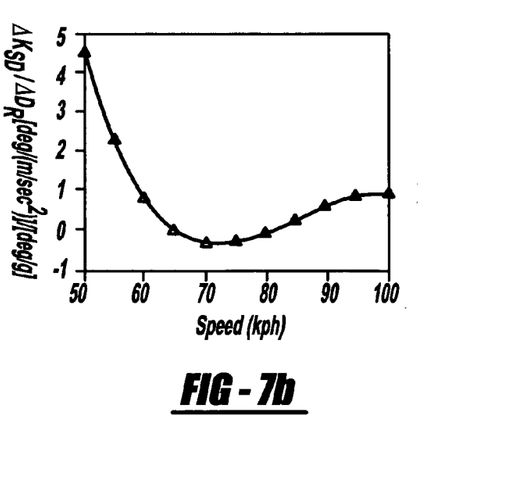

FIGS. 7(a) and 7(b) are graphs with vehicle speed on the horizontal axis and side-slip rate feedback angle on the vertical axis showing examples of gain sensitivities corresponding to changes in the front-wheel cornering compliance and the rear-wheel cornering compliance, respectively.

The adapted yaw rate feedback angle signal $\delta_{RP}$, the adapted yaw rate acceleration feedback angle signal $\delta_{RD}$, the adapted side-slip feedback angle signal $\delta_{SP}$ and the adapted side-slip rate feedback angle signal $\delta_{SD}$ are added together by adders 130, 132 and 134 to generate the closed-loop feedback signal $\delta_{CL}$. If the switch 92 is closed, the closed-loop feedback signal $\delta_{CL}$ is added to the open-loop steering signal $\delta_{OL}$ by an adder 136 to generate the rear-wheel steering angle signal $\delta_R$ that is applied to the actuator 32.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A control system for providing active rear-wheel steering for a vehicle, said system comprising:
   a vehicle dynamics parameter estimation sub-system responsive to input signals, said vehicle dynamics parameter estimation sub-system employing a parameter estimation algorithm for estimating vehicle parameters based on the input signals, said vehicle dynamics parameter estimation sub-system comparing the estimated vehicle parameters with nominal vehicle parameters and generating difference signals indicative of the change between the estimated vehicle dynamics parameters and the nominal vehicle dynamic parameters;
   an open-loop control sub-system for generating an open-loop steering control signal, said open-loop control sub-system being responsive to a vehicle speed signal, a front-wheel steering angle signal and the difference signals, said open-loop control sub-system including an open-loop look-up table for generating a nominal open-loop steering signal based on the vehicle speed signal and the front-wheel steering angle signal, said open-loop sub-system further including an open-loop adaptive compensation sub-system for generating a corrected open-loop steering angle signal based on the front-wheel steering angle signal, the open-loop steering angle signal and the difference signal, said open-loop steering control signal being a combination of the nominal open-loop steering angle signal and the corrected open-loop steering angle signal; and
   a closed-loop control sub-system being responsive to the vehicle speed signal, the front-wheel steering angle signal and the input signals applied to the vehicle dynamics parameter estimation sub-system, said closed-loop sub-system including at least one look-up table providing a nominal closed-loop steering angle signal and at least one closed-loop adaptive compensation process sub-system providing a corrected closed-loop steering angle signal, wherein the closed-loop steering control signal is a combination of the nominal closed-loop steering angle signal and the corrected closed-loop steering angle signal, and wherein the open-loop steering control signal and the closed-loop steering control signal are combined to provide a wheel steering signal.

2. The system according to claim 1 wherein the at least one closed-loop look-up table and the at least one closed-loop adaptive compensation sub-system include a yaw rate feedback look-up table and a yaw rate feedback adaptive compensation sub-system, said yaw rate feedback look-up table providing an original yaw rate feedback angle signal and said yaw rate feedback adaptive compensation sub-system providing a corrected yaw rate feedback angle signal based on the estimated vehicle dynamics parameters.

3. The system according to claim 1 wherein the at least one closed-loop look-up table and the at least one closed-loop adaptive compensation sub-system include a yaw rate acceleration feedback look-up table and a yaw rate acceleration feedback adaptive compensation sub-system, said yaw rate acceleration feedback look-up table providing an original yaw rate acceleration feedback angle signal and said yaw rate acceleration feedback adaptive compensation sub-system providing a corrected yaw rate acceleration feedback angle signal based on the estimated vehicle dynamics parameters.

4. The system according to claim 1 wherein the at least one closed-loop look-up table and the at least one closed-loop adaptive compensation sub-system include a side-slip feedback look-up table and a side-slip feedback adaptive compensation sub-system, said side-slip feedback look-up table providing an original side-slip feedback angle signal and said side-slip feedback adaptive compensation sub-system providing a corrected side-slip feedback angle signal based on the estimated vehicle dynamics parameters.

5. The system according to claim 1 wherein the at least one closed-loop look-up table and the at least one closed-loop adaptive compensation sub-system include a side-slip rate feedback look-up table and a side-slip rate feedback adaptive compensation sub-system, said side-slip rate feedback look-up table providing an original side-slip rate feedback angle signal and said side-slip rate feedback adaptive compensation sub-system providing a corrected side-slip rate feedback angle signal based on the estimated vehicle dynamics parameters.

6. The system according to claim 1 wherein the vehicle dynamics parameter estimation sub-system receives a front-wheel steering angle signal, a rear-wheel steering angle signal, a vehicle lateral acceleration signal, a vehicle yaw rate signal and the vehicle speed signal as the input signals.

7. The system according to claim 1 wherein the open-loop sub-system includes a switch, said switch being responsive to a switch signal from the closed-loop sub-system to disconnect the open-loop adaptive compensation sub-system when the closed-loop sub-system is providing part of the wheel steering signal.

8. The system according to claim 1 wherein the open-loop adaptive compensation process sub-system generates the corrected open-loop steering value by:

$$\Delta\delta_{OL} = \left[(\hat{D}_R - D_R^o) - (\hat{D}_F - D_F^o)\Gamma(V_x)\right]\frac{V_x^2}{(K_{us}^o V_x^2 + Lg)}(\delta_F - \delta_{OL}^o)$$

where,
  $\Delta\delta_R$ is a compensation angle;
  $\hat{D}_F$ is a front-wheel cornering compliance estimation;
  $\hat{D}_R$ is a rear-wheel cornering compliance estimation;
  $D_F^o$ is an original vehicle front-wheel cornering compliance;
  $D_R^o$ is an original vehicle rear-wheel cornering compliance;
  $\Gamma(V_x)$ is a front adaptation gain signal;
  $K_{us}^o$ is an original vehicle understeer coefficient;
  L is a vehicle wheel base; and
  g is a constant of gravity.

9. The system according to claim 8 wherein the front adaptation gain signal $\Gamma(V_x)$ includes a yaw rate gain recovery strategy where $\Gamma(V_x)=1$.

10. The system according to claim 8 wherein the front adaptation gain signal $\Gamma(V_x)$ includes a side-slip gain recovery strategy where, $$\Gamma(V_x) = \left( \frac{\hat{D}_R V_x^2 - bg}{\hat{D}_F V_x^2 + ag} \right),$$

and where, a is the distance from a front axle of the vehicle to the center of gravity and b is the distance from a rear axle of the vehicle to the center of gravity.

11. The system according to claim 8 wherein the front adaptation gain signal $\Gamma(V_x)$ includes a side-slip to yaw rate ratio recovery strategy where,
$\Gamma(V_x)=T^0(V_x)$, and where, $T^0(V_x)$ is an original front-to-rear gear ratio schedule of the-vehicle.

12. A control system for providing active rear-wheel steering for a vehicle, said system comprising:
a vehicle dynamics parameter estimation sub-system responsive to input signals, said vehicle dynamics parameter estimation sub-system employing a parameter estimation algorithm for estimating vehicle parameters based on the input signals, said vehicle dynamics parameter estimation sub-system comparing the estimated vehicle parameters with nominal vehicle parameters and generating difference signals indicative of the change between the estimated vehicle dynamics parameters and the nominal vehicle dynamic parameters; and
an open-loop control sub-system for generating an open-loop steering control signal, said open-loop control sub-system being responsive to a vehicle speed signal, a front-wheel steering angle signal and the difference signals, said open-loop control sub-system including an open-loop look-up table for generating a nominal open-loop steering signal based on the vehicle speed signal and the front-wheel steering angle signal, said open-loop sub-system further including an open-loop adaptive compensation sub-system for generating a corrected open-loop steering angle signal based on the front-wheel steering angle signal, the open-loop steering angle signal and the difference signal, said open-loop steering control signal being a combination of the nominal open-loop steering angle signal and the corrected open-loop steering angle signal and provide at least part of a wheel steering signal.

13. The system according to claim 12 wherein the vehicle dynamics parameter estimation sub-system receives a front-wheel steering angle signal, a rear-wheel steering angle signal, a vehicle lateral acceleration signal, a vehicle yaw rate signal and the vehicle speed signal as the input signals.

14. The system according to claim 12 wherein the open-loop adaptive compensation process sub-system generates the corrected open-loop steering value by:

$$\Delta \delta_{OL} = \left[ (\hat{D}_R - D_R^o) - (\hat{D}_F - D_F^o) \Gamma(V_x) \right] \frac{V_x^2}{(K_{us}^o V_x^2 + Lg)} (\delta_F - \delta_{OL}^o)$$

where,
$\Delta\delta_R$ is a compensation angle;
$\hat{D}_F$ is a front-wheel cornering compliance estimation;
$\hat{D}_R$ is a rear-wheel cornering compliance estimation;
$D_F^o$ is an original vehicle front-wheel cornering compliance;
$D_R^o$ is an original vehicle rear-wheel cornering compliance;
$\Gamma(V_x)$ is a front adaptation gain signal;
$K_{us}^o$ is an original vehicle understeer coefficient;
L is a vehicle wheel base; and
g is a constant of gravity.

15. The system according to claim 14 wherein the front adaptation gain signal $\Gamma(V_x)$ includes a yaw rate gain recovery strategy where $\Gamma(V_x)=1$.

16. The system according to claim 14 wherein the front adaptation gain signal $\Gamma(V_x)$ includes a side-slip gain recovery strategy where, $$\Gamma(V_x) = \left( \frac{\hat{D}_R V_x^2 - bg}{\hat{D}_F V_x^2 + ag} \right),$$

and where, a is the distance from a front axle of the vehicle to the center of gravity and b is the distance from a rear axle of the vehicle to the center of gravity.

17. The system according to claim 14 wherein the front adaptation gain signal $\Gamma(V_x)$ includes a side-slip to yaw rate ratio recovery strategy where,
$\Gamma(V_x)=T^0(V_x)$, and where, $T^0(V_x)$ is an original front-to-rear gear ratio schedule of the vehicle.

18. A control system for providing active rear-wheel steering for a vehicle, said system comprising:
a vehicle dynamics parameter estimation sub-system responsive to input signals including a front-wheel steering angle signal, a rear-wheel steering angle signal, a vehicle lateral acceleration signal, a vehicle yaw rate signal and the vehicle speed signal, said vehicle dynamics parameter estimation sub-system employing a linear parameter estimation algorithm for estimating vehicle parameters based on the input signals, said vehicle dynamics parameter estimation system comparing the estimated vehicle parameters with nominal vehicle parameters and generating difference signals indicative of the change between the estimated vehicle dynamics parameters and the nominal vehicle dynamic parameters;
an open-loop control sub-system for generating an open-loop steering control signal, said open-loop control sub-system being responsive to a vehicle speed signal, a front-wheel steering angle signal and the difference signals, said open-loop controller including an open-loop look-up table for generating a nominal open-loop steering signal based on the vehicle speed signal and the front-wheel steering angle signal, said open-loop sub-system further including an open-loop adaptive compensation sub-system for generating a corrected open-loop steering angle signal based on the front-wheel steering angle signal, the open-loop steering angle signal and the difference signal, said open-loop steering control signal being a combination of the nominal open-loop steering angle signal and the corrected open-loop steering angle signal; and
a closed-loop control sub-system being responsive to the vehicle speed signal, the front-wheel steering angle signal and the input signals applied to the vehicle dynamics parameter estimation sub-system, said closed-loop sub-system including include a yaw rate feedback look-up table and a yaw rate feedback adaptive compensation sub-system, said yaw rate feedback look-up table providing an original yaw rate feedback angle signal and said yaw rate feedback adaptive compensation sub-system providing a corrected yaw rate feedback angle signal based on the estimated vehicle dynamics parameters, said closed-loop sub-system further including a yaw rate acceleration feedback look-up table and a yaw rate acceleration feedback adaptive compensation sub-system, said yaw rate acceleration feedback look-up table providing an original yaw rate acceleration feedback angle signal and said yaw rate acceleration feedback adaptive compensation sub-system providing a corrected yaw rate acceleration feedback angle signal based on the estimated vehicle dynamics parameters, said closed-loop sub-system further including a side-slip feedback look-up table and a side-slip feedback adaptive compensation sub-system, said side-slip feedback look-up table providing an original side-slip feedback angle signal and said side-slip feedback adaptive compensation sub-system providing a corrected side-slip feedback angle signal based on the estimated vehicle dynamics parameters and said closed-loop sub-system further including a side-slip rate feedback look-up table and a side-slip rate feedback adaptive compensation sub-system, said side-slip rate feedback look-up table providing an original side-slip rate feedback angle signal and said side-slip rate feedback adaptive compensation sub-system providing a corrected side-slip rate feedback angle signal based on the estimated vehicle dynamics parameters, wherein the original yaw rate feedback angle signal, the corrected yaw rate feedback angle signal, the original yaw rate acceleration feedback angle signal, the corrected yaw rate acceleration feedback angle signal, the original side-slip feedback angle signal, the corrected side-slip feedback angle signal, the original side-slip rate feedback angle signal, and the corrected side-slip rate feedback angle signal are combined to be a closed-loop steering control signal, and wherein the open-loop steering control signal and the closed-loop steering control signal are combined to provide a rear-wheel steering signal.

19. The system according to claim 18 wherein the open-loop sub-system includes a switch, said switch being responsive to a switch signal from the closed-loop sub-system to disconnect the open-loop adaptive compensation sub-system when the closed-loop sub-system is active.

20. The system according to claim 18 wherein the open-loop adaptive compensation process sub-system generates the corrected open-loop steering value by:

$$\Delta \delta_{OL} = [(\hat{D}_R - D_R^o) - (\hat{D}_F - D_F^o)\Gamma(V_x)]\frac{V_x^2}{(K_{us}^o V_x^2 + Lg)}(\delta_F - \delta_{OL}^o)$$

where,
$\Delta \delta_R$ is a compensation angle;
$\hat{D}_F$ is a front-wheel cornering compliance estimation;
$\hat{D}_R$ is a rear-wheel cornering compliance estimation;
$D_F^o$ is an original vehicle front-wheel cornering compliance;
$D_R^o$ is an original vehicle rear-wheel cornering compliance;
$\Gamma(V_x)$ is a front adaptation gain signal;
$K_{us}^o$ is an original vehicle understeer coefficient;
L is a vehicle wheel base; and
g is a constant of gravity.

21. The system according to claim 20 wherein the front adaptation gain signal $\Gamma(V_x)$ includes a yaw rate gain recovery strategy where $\Gamma(V_x)=1$.

22. The system according to claim 20 wherein the front adaptation gain signal $\Gamma(V_x)$ includes a side-slip gain recovery strategy where, $$\Gamma(V_x) = \left(\frac{\hat{D}_R V_x^2 - bg}{\hat{D}_F V_x^2 + ag}\right),$$

and where, a is the distance from a front axle of the vehicle to the center of gravity and b is the distance from a rear axle of the vehicle to the center of gravity.

23. The system according to claim 20 wherein the front adaptation gain signal $\Gamma(V_x)$ includes a side-slip to yaw rate ratio recovery strategy where,
$\Gamma(V_x)=T^o(V_x)$, and where, $T^o(V_x)$ is an original front-to-rear gear ratio schedule of the vehicle.

* * * * *